(12) United States Patent
Nakamura et al.

(10) Patent No.: US 8,229,169 B2
(45) Date of Patent: Jul. 24, 2012

(54) FEATURE INFORMATION COLLECTING APPARATUS AND FEATURE INFORMATION COLLECTING METHOD

(75) Inventors: Masaki Nakamura, Okazaki (JP); Koichi Nakao, Okazaki (JP); Motoki Kanba, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 1168 days.

(21) Appl. No.: 12/076,068

(22) Filed: Mar. 13, 2008

(65) Prior Publication Data

US 2008/0240573 A1    Oct. 2, 2008

(30) Foreign Application Priority Data

Mar. 30, 2007    (JP) ................................ 2007-091323

(51) Int. Cl.
*G06K 9/46* (2006.01)
(52) U.S. Cl. ...................... 382/104; 382/103; 382/190
(58) Field of Classification Search .................. 382/100, 382/104, 190
See application file for complete search history.

(56) References Cited

U.S. PATENT DOCUMENTS

| | | | | |
|---|---|---|---|---|
| 5,521,579 | A * | 5/1996 | Bernhard | 340/438 |
| 6,047,234 | A * | 4/2000 | Cherveny et al. | 701/200 |
| 6,226,592 | B1 * | 5/2001 | Luckscheiter et al. | 701/301 |
| 6,292,111 | B1 * | 9/2001 | Ishikawa et al. | 340/937 |
| 6,381,533 | B1 * | 4/2002 | Crane et al. | 701/200 |
| 6,560,529 | B1 * | 5/2003 | Janssen | 701/200 |
| 6,737,963 | B2 * | 5/2004 | Gutta et al. | 340/435 |
| 6,844,112 | B2 | 1/2005 | Inoue et al. | |
| 7,603,215 | B2 * | 10/2009 | Matsumoto et al. | 701/41 |
| 2004/0143381 | A1 * | 7/2004 | Regensburger et al. | 701/36 |
| 2006/0233424 | A1 | 10/2006 | Miyajima et al. | |
| 2008/0273757 | A1 * | 11/2008 | Nakamura et al. | 382/104 |

FOREIGN PATENT DOCUMENTS

| | | | |
|---|---|---|---|
| AU | 755096 | * | 11/2000 |
| EP | 0 738 946 A1 | | 10/1996 |
| EP | 0 782 118 A1 | | 7/1997 |
| EP | 0 921 509 A2 | | 6/1999 |
| EP | 1 905 766 | | 4/2008 |

(Continued)

OTHER PUBLICATIONS

Fuh Chiou-Shann et al., "Road-sign detection and tracking" IEEE Transactions on Vehicular Technology, IEEE Service Center, Piscataway, NJ, vol. 52, No. 5, Sep. 1, 2003, pp. 1329-1341.

(Continued)

*Primary Examiner* — Stephen R Koziol
(74) *Attorney, Agent, or Firm* — Oliff & Berridge, PLC (57) ABSTRACT

Feature information collecting apparatuses, methods, and programs acquire vehicle position information that represents the current position of a vehicle, acquire image information for a vicinity of the vehicle, and carry out image recognition processing on recognition target objects that are included in the image information. The apparatuses, methods, and programs store recognition information in a memory that represents a result of the image recognition of the recognition target objects in association with information for the recognition position of the recognition target objects, the recognition position determined based on the vehicle position information. The apparatuses, methods, and programs extract, as learned features, recognition target objects that can be repeatedly recognized by image recognition based on a plurality of sets of recognition information related to the same position, the plurality of sets of recognition information being stored due to the image information for the same position being recognized a plurality of times by image recognition.

18 Claims, 7 Drawing Sheets

FOREIGN PATENT DOCUMENTS

| | | |
|---|---|---|
| JP | A 09-243389 | 9/1997 |
| JP | A-11-351895 | 12/1999 |
| JP | A-2000-038558 | 2/2000 |
| JP | A 2000-293670 | 10/2000 |
| JP | A 2000-321081 | 11/2000 |
| JP | A-2002-259969 | 9/2002 |
| JP | A-2003-036500 | 2/2003 |
| JP | A-2004-037151 | 2/2004 |
| JP | A-2004-069603 | 3/2004 |
| JP | A 2006-038558 | 2/2006 |
| JP | A-2006-189326 | 7/2006 |
| JP | A-2006-209510 | 8/2006 |
| JP | A-2006-235752 | 9/2006 |
| JP | A-2006-284281 | 10/2006 |
| JP | A-2006-313519 | 11/2006 |
| JP | A-2006-330908 | 12/2006 |
| JP | A-2006-343829 | 12/2006 |
| JP | A-2007-041916 | 2/2007 |
| JP | A-2007-066305 | 3/2007 |
| JP | A-2007-272624 | 10/2007 |
| WO | WO 2006/080547 A1 | 8/2006 |

OTHER PUBLICATIONS

Bertozzi M. et al., "Artificial Vision in road vehicles" Proceedings of the IEEE, IEEE, New York, vol. 90, No. 7, Jul. 1, 2002, pp. 1258-1271.

Oct. 2, 2009 European Search Report issued in EP 08 00 4827.

Japanese Patent Office, Partial Translation of Final Notification of Reason(s) for Rejection mailed Mar. 4, 2010 in Japanese Patent Application No. 2007-091323 w/English-language Translation.

Chinese Patent Office, Final Notification of Reason for Refusal mailed Sep. 22, 2011 in Chinese Patent Application No. 200810083677.0 w/Partial English-language Translation.

Japanese Patent Office, Notification of Reason(s) for Refusal mailed Mar. 22, 2012 in Japanese Patent Application No. 2010-104470 w/partial English-language Translation.

Japanese Patent Office, Notification of Reason(s) for Refusal mailed May 17, 2012 in Japanese Patent Application No. 2010-104471 w/partial English-language Translation.

* cited by examiner

FEATURE INFORMATION COLLECTING APPARATUS AND FEATURE INFORMATION COLLECTING METHOD

INCORPORATION BY REFERENCE

The disclosure of Japanese Patent Application No. 2007-091323, filed on Mar. 30, 2007, including the specification, drawings, and abstract is incorporated herein by reference in its entirety.

BACKGROUND

1. Related Technical Fields

Related technical fields include feature information collecting apparatuses, methods, and programs that collect information about features included in image information of the vicinity of a vehicle 2. Description of the Related Art Conventional navigation apparatuses correct the position correction of a vehicle by recognizing features included in image information of the vicinity of the vehicle (see, e.g., Japanese Patent Application Publication No. JP-A-H09-243389). The image information is acquired by an imaging device or the like mounted on the vehicle. The navigation apparatus detects an intersection by recognizing an intersection symbol in the image data and finds the distance from the vehicle position to the intersection symbol. A vehicle position correcting device corrects the vehicle position to a point on the traveled road that deviates by the distance from the intersection position. The intersection symbol denotes, for example, a traffic signal, a pedestrian crossing, or the white lines for the center divider.

In Japanese Patent Application Publication No. JP-A-2000-293670, a database is disclosed that relates to such features. Instead of manually recognizing features, features are photographed while a specialized measurement vehicle is traveling, and the features are automatically recognized from the photographed images.

Japanese Patent Application Publication No. JP-A-2006-038558, discloses a navigation apparatus that collects information about features based on the results of image recognition of target features that are included in image information about the vicinity of the vehicle. In Japanese Patent Application Publication No. JP-A-2006-038558, traffic signs and road traffic information display boards that are provided along the road serve as target features. In addition, feature information such as the sign information extracted from the recognition results is stored in a map database in association with position information and section information. At this time, the position information and the section information that are associated with the feature information is determined based on information from a GPS receiver, a gyroscope, a vehicle speed sensor, or the like that are generally used in navigation apparatuses.

SUMMARY

However, the position information that is acquired by a GPS receiver, a gyroscope, a vehicle speed sensor or the like that are used in a navigation apparatus generally includes an error from several meters to several tens of meters. Thus, there is a possibility that the feature information stored in the map database includes such error.

However, as disclosed in Japanese Patent Application Publication No. JP-A-2000-293670, collecting high accuracy feature information for all roads by using a specialized measurement vehicle is not practical due to time and cost.

Therefore, high accuracy feature information may be prepared for roads that have many users, such as arterial roads. For a particular user, high accuracy feature information on roads where the user frequently travels may be prepared, and thereby the user can enjoy a variety of detailed services, including navigation. Therefore, irrespective of whether a road is an arterial road, high accuracy feature information may be prepared at a low cost in conformity with the usage patterns of the user. In addition, on roads such as mountain roads for which few standard road markings and the like are provided on the road surface, the collection of feature information in which such road markings are the target objects is difficult.

Exemplary implementations of the brad principles described herein provide feature information collecting apparatuses, methods, and programs that enable the collection of accurate feature information at low cost depending on road usage conditions by a user of roads for which feature information has not been prepared.

Exemplary implementations provide apparatuses, methods, and programs that acquire vehicle position information that represents the current position of a vehicle, acquire image information for a vicinity of the vehicle, and carry out image recognition processing on recognition target objects that are included in the image information. The apparatuses, methods, and programs store recognition information in a memory that represents a result of the image recognition of the recognition target objects in association with information for the recognition position of the recognition target objects, the recognition position determined based on the vehicle position information. The apparatuses, methods, and programs extract, as learned features, recognition target objects that can be repeatedly recognized by image recognition based on a plurality of sets of recognition information related to the same position, the plurality of sets of recognition information being stored due to the image information for the same position being recognized a plurality of times by image recognition.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
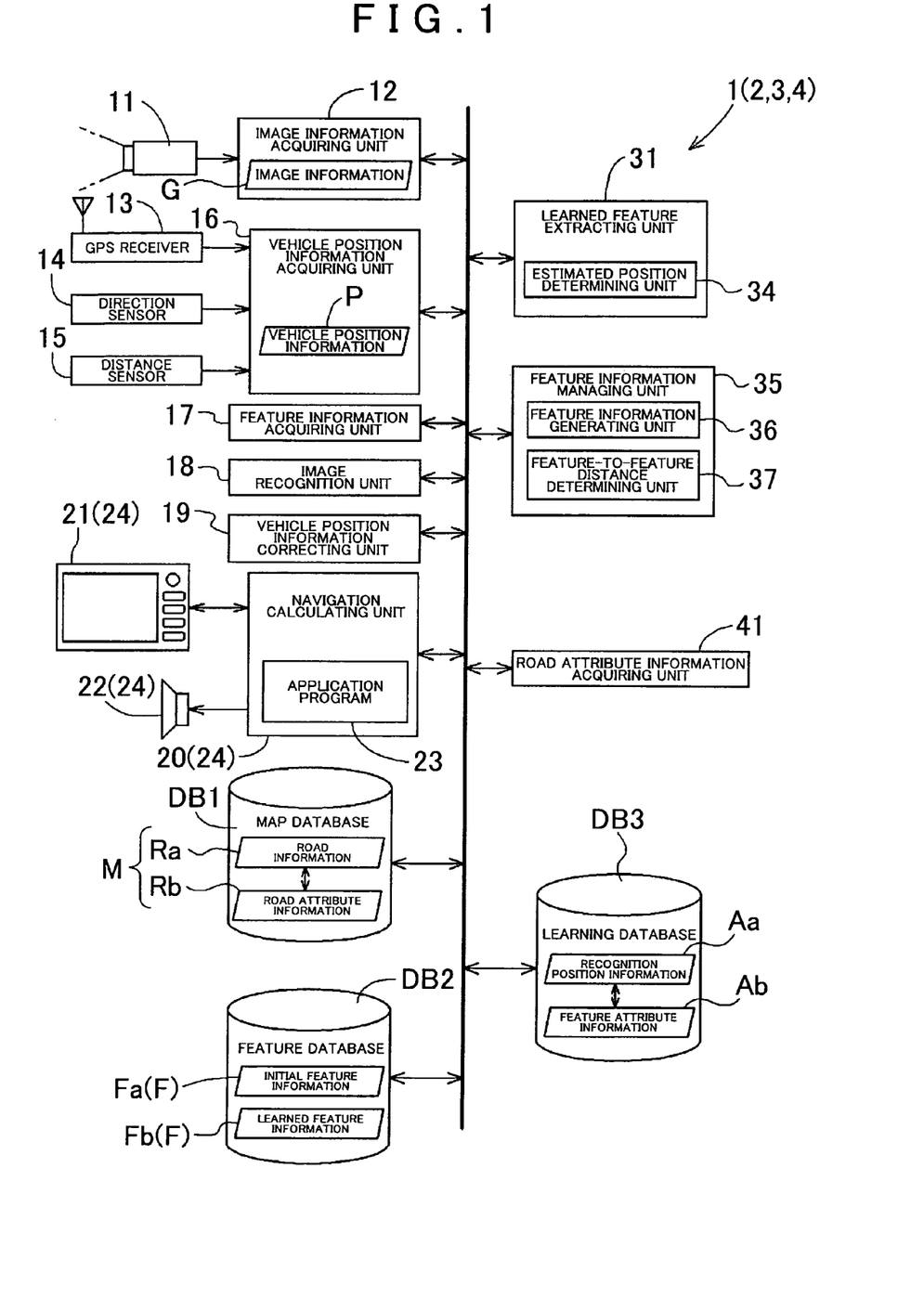
FIG. 1 is a block diagram that schematically shows an exemplary structure of a navigation apparatus.

FIG. 1 is a block diagram that shows the schematic structure of an exemplary navigation apparatus 1. The navigation apparatus 1 may physically, functionally, and/or conceptually include a feature information collecting apparatus 2, an image recognition apparatus 3, and a vehicle position recognition apparatus 4. The navigation apparatus 1 carries out the image recognition processing on the recognition target objects that are included in image information G, and extracts, as learned features, recognition target objects for which image recognition can be performed repeatedly based on the recognition information that represents recognition results of the recognition target objects. In addition, by reflecting position information F as learned feature information F in a feature database DB2, even for roads for which the feature information F has not been prepared, it is possible to carry out the correction of vehicle position information P using the feature information F. In addition, the navigation apparatus 1 carries out navigation processing such as route guidance based on the corrected vehicle position information P.

Each functional unit of the navigation apparatus 1 that is shown in FIG. 1 is structured by functional units for carrying out various processes on input data that are implemented by hardware, software (programs), or both, using a controller (e.g., an arithmetic processing apparatus such as a CPU or the like) as a central member. Specifically, these functional units include an image information acquiring unit 12, a vehicle position information acquiring unit 16, a feature information acquiring unit 17, an image recognition unit 18, a vehicle position information correcting unit 19, a navigation calculating unit 20, a learned feature extracting unit 31, an estimated position determining unit 34, a feature information managing unit 35, and a road attribute information acquiring unit 41. In addition, each of these functional units is structured so as to be able to exchange information with each other. In addition, for each of the databases DB1 to DB3 of the navigation apparatus 1, an apparatus that has a memory (e.g., a recording medium) that can store information and a driving apparatus therefore, such as hardware disk drive, a DVD drive provided with a DVD-ROM, or a CD drive provided with a CD-ROM, is provided as a hardware structure. Below, the structures of each of the units of the navigation apparatus 1 according to the present example will be explained in detail.

Figure 2:
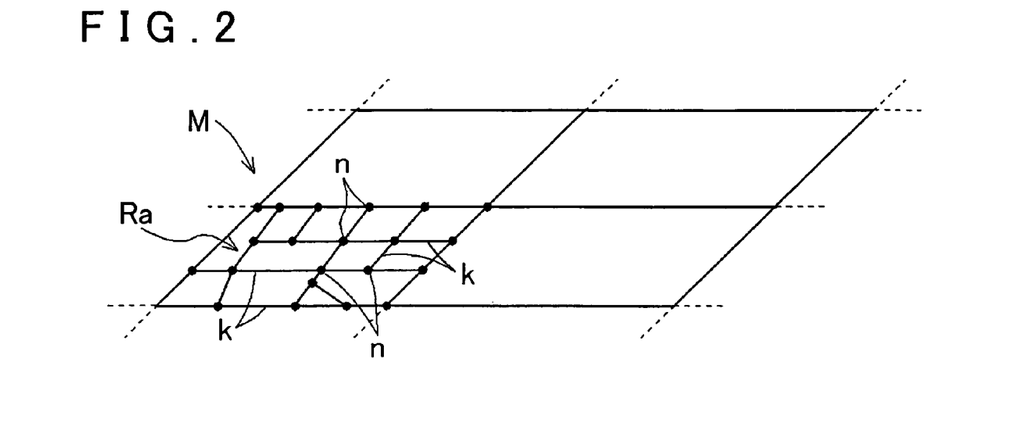
FIG. 2 is a drawing that shows an example of the structure of the map information that is stored in a map database.

The map database DB1 is a database in which map information M, which is divided into predetermined segments, is recorded. FIG. 2 is an explanatory drawing that shows an example of the structure of the map information M that is stored in the map database DB1. As shown in the figure, the map information M includes road information Ra that represents a road network by the connection relationships between a plurality of nodes n that correspond to intersections and links k that correspond to the roads that join each of the intersections. Each node n includes information about the position (coordinates) on a map, which is represented by latitude and longitude. Each of the links k is connected via a node n. Each of the links k includes, as attribute information, information such as the road type, region classification, link length, road width, and geometric interpolated points for representing the link geometry. The road classification information is information about the road type when the roads are divided into a plurality of classifications, such as automobile-only roads, urban roads, narrow streets, mountain roads, and the like.

The region classification information is information about the regional classification when a region is divided into a plurality of segments that are provided with roads that correspond to the links k. Such segments include, for example, regions such as the Kanto region or the Kansai region, or administrative divisions, such as Tokyo metropolis, prefectures, cities, towns, and villages. The attribute information of these links k corresponds to road attribute information Rb (refer to FIG. 1). Note that, in FIG. 2, only the road information Ra for one division is illustrated, and the road information Ra for the other divisions is omitted for simplicity.

The feature database DB2 is a database on which information about various features that are provided on the road and in the vicinity of the road, that is, the feature information F, is stored. As shown in FIG. 1, in the present example, two types of information are stored in the feature database DB2: initial feature information Fa and learned feature information Fb.

The initial feature information Fa denotes the feature information F for a plurality of features that have been prepared and recorded in advance in the feature database DB2. Such initial feature information Fa is prepared only for a portion of regions and roads, such as for large city areas and arterial roads and the like, among all of the regions for which the map information M that includes the road information Ra is prepared. In contrast, as will be described below, the learned feature information Fb is the feature information F that is stored in the feature DB 2 as a result of learning by using the image recognition results for the target features that have been obtained by the image recognition unit 18. Note that, in the following explanation, the term "feature information F" used alone is a term that encompasses both the initial feature information Fa and the learned feature information Fb.

Figure 3:
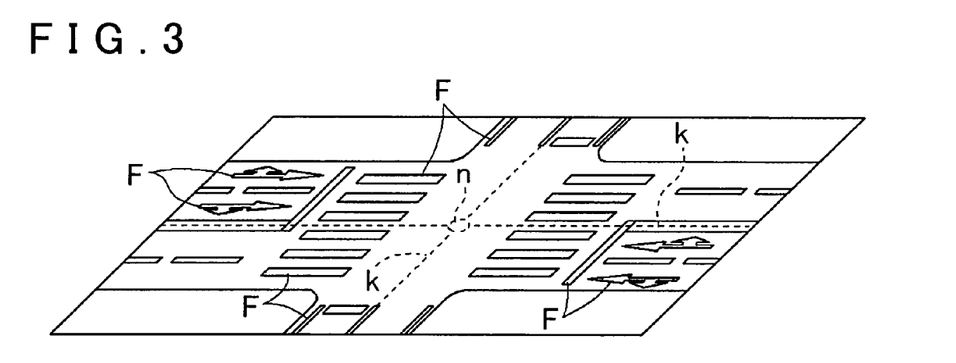
FIG. 3 is a drawing that shows examples of the feature information for road markings that are stored in a feature database.

Road markings (e.g., painted markings) that are provided on the surface of the road are included in the features for which feature information F (in particular, the initial feature information Fa) is stored in the feature database DB2. FIG. 3 is an explanatory drawing that shows an example of the feature information F for road markings that are stored in the feature database DB2. Features associated with such road markings include, for example, pedestrian crossings, stop lines, vehicle speed markings, carriageway lines (including various types of carriageway markings such as solid lines, broken lines, double lines, and the like) that separate lanes along the road, forward travel direction traffic carriageway markings (including arrow markings, for example, forward travel arrows and right turn arrows, and the like) that indicate the forward travel direction for each lane. Note that features that are contained in the feature information F can include, in addition to such road markings, various features such as traffic signals, signs, overpasses, tunnels, and the like.

The feature information F includes feature position information for each of the features and feature attribute information that is associated therewith. The feature position information includes information about the position (coordinates) on the map of representative points for each of the features that is associated with a link k and a node n that structure the road information Ra, and information about the orientation of each of the features. The representative points in the initial feature information Fa, for example, are set in proximity to the center portion of each of the features in the lengthwise direction and the widthwise direction. The representative points for the learned feature information Fb will be explained below. The feature attribute information for the initial feature information Fa includes feature class information and feature contour information, such as the shape, size, color, and the like, of the features.

For example, specifically, the feature type in the initial feature information Fa is information that represents the type of the features that have fundamentally identical contours, such as "pedestrian crossings," "stop lines," or "speed markings (for example, "30 km/h")." The feature information for the learned feature information Fb will be explained below. In the present example, the feature information F includes associated information that represents the relationship with other approaching features and feature distance information that represents the distance between one feature and another feature. The associated information is information that allows the anticipation of features that are present in the forward direction due to recognizing by image recognition one feature while a vehicle 50 travels forward along the road. In addition, the feature distance information is information for accurately anticipating the distance from the vehicle 50 to such a feature that is present in the forward direction.

The learning database DB3 is a database that stores recognition position information Aa that has been derived by the learned feature extracting unit 31 in a form in which the recognition target objects that correspond to each of the sets of the recognition position information Aa can be distinguished. In order to render the recognition target objects that correspond to each of the sets of the recognition position information Aa distinguishable, each of the sets of the recognition position information Aa and the feature attribute information Ab for the recognition target objects that correspond thereto are stored in association with each other. The specific content of the recognition position information Aa and the feature attribute information Ab that are stored in this learning database DB3 will be explained in detail below.

Figure 4:
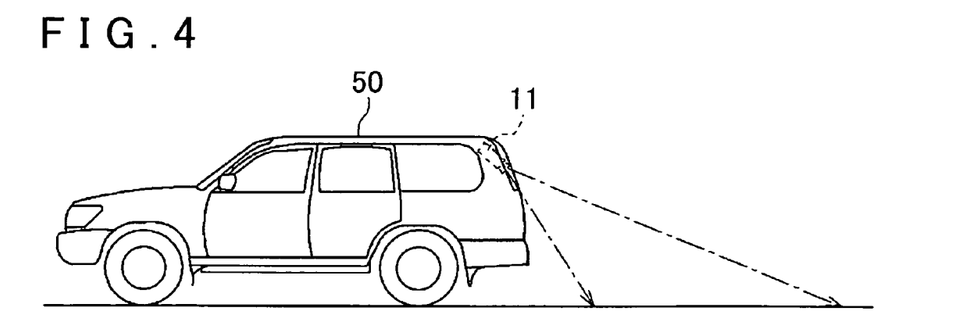
FIG. 4 is a drawing that shows an example of the arrangement of an imaging device on a vehicle.

The image information acquiring unit 12 functions as an image information acquiring device that acquires image information G of the vicinity of the vehicle that has been photographed by the imaging device 11. The imaging device 11 is, for example, a vehicle-mounted camera that is provided with an image-pickup element, and is provided at a position that enables photographing at least the surface of the road in the vicinity of the vehicle 50. It is possible to use, for example, a back camera that photographs the road surface behind the vehicle 50, as shown in FIG. 4, as such an imaging device 11. The image information acquiring unit 12 captures, via a frame memory (not illustrated) or the like, photographic information that is photographed by the imaging device 11 at predetermined time intervals. The time interval for capturing the image information G at this time can be set at, for example, approximately 10 to 50 ms. Thus, the image information acquiring unit 12 can continuously acquire a plurality of frames of image information G that has been photographed by the imaging device 11. The acquired image information G is output to the image recognition unit 18.

The vehicle position information acquiring unit 16 acquires vehicle position information P that shows the current position of the vehicle 50. The vehicle position information acquiring unit 16 is connected to a GPS receiver 13, a direction sensor 14, and a distance sensor 15. The GPS receiver 13 is an apparatus that receives GPS signals from GPS (Global Positioning System) satellites. These GPS signals are normally received at one-second intervals and output to the vehicle position information acquiring unit 16. In the vehicle position information acquiring unit 16, the signals from the GPS satellites that have been received by the GPS receiver 13 are analyzed, arid it is thereby possible to acquire information about the current position (latitude and longitude) of the vehicle 50, the forward travel direction, the movement speed, the time, and the like.

The direction sensor 14 is a sensor that detects the forward direction of the vehicle 50 and changes in the direction thereof. This direction sensor 14 is structured, for example, by a gyroscopic sensor, a geomagnetic sensor, an optical rotation sensor or a rotation resistance sensor that is attached to a rotation portion of the steering wheel, or an angle sensor that is attached to a wheel portion, or the like. In addition, the direction sensor 14 outputs the detected result to the vehicle position information acquisition unit 16. The distance sensor 15 is a sensor that detects the vehicle speed and the movement distance of the vehicle 50. The distance sensor 15 is structured, for example, by a vehicle speed pulse sensor that outputs a pulse signal each time the drive shaft or the steering wheel of the vehicle rotates by a specified amount, or a yaw sensor that detects the acceleration of the vehicle 50 and a circuit that integrates the detected acceleration. In addition, the distance sensor 15 outputs information about the vehicle speed and the movement distance as the detected results to the vehicle position information acquiring unit 16.

The vehicle position information acquiring unit 16 carries out the calculation in which the vehicle position is specified by a well-known method based on the outputs from the GPS receiver 13, the direction sensor 14, and the distance sensor 15. The vehicle position information acquiring unit 16 acquires the road information Ra in the vicinity of the position of the vehicle that has been extracted from the map database DB1, and also carries out corrections in which the vehicle is positioned on the road that is shown in the road information Ra by carrying out well-known map matching based thereon. In this manner, the vehicle position information acquiring unit 16 acquires the vehicle position information P that includes information about the current position of the vehicle 50, which is represented by latitude and longitude, and information about the forward travel direction of the vehicle 50.

The feature information acquiring unit 17 extracts and acquires the feature information F about features that are present in the vicinity of the vehicle 50 from the feature database DB2 based on the vehicle position information P and the like that has been acquired by the vehicle position information acquiring unit 16. Both the initial feature information Fa and the learned feature information Fb are included in the feature information F. In the present example, based on the vehicle position information P, the feature information acquiring unit 17 extracts, from the feature database DB2, the feature information F about target features that are present in the interval from the current position of the vehicle 50, which is shown in the vehicle position information P, to the end point of the link k, which represents the road on which the vehicle 50 is traveling. The term "target feature" denotes a feature that is the target object of position correction image recognition processing (to be explained in detail below) by the image recognition unit 5. Therefore, the feature information F that has been acquired by the feature information acquiring unit 17 is output to the image recognition unit 18 and the vehicle position information correction unit 19.

In the present example, in addition to various road markings that are provided on the surface of the road, such as pedestrian crossings, stop lines, and vehicle speed markings and the like, which have been prepared in advance as initial features, target features also include stains, grime, and cracks on the road surface, links between pavement sections, and manhole covers, and the like that have been collected as learned features. In addition, various types of road markings that are not registered as initial features because they are infrequently used as target features may serve as learned features. Furthermore, recognition target objects such as shadows, which appear when predetermined conditions such as a particular time and weather occur together, also become target features as limited learned features that are valid only when these conditions are satisfied.

Note that the feature information acquiring unit 17 also functions as a presence determining device that refers to the feature DB2 based on the vehicle position information P and determines whether target features that have been stored as feature information F are present in the vicinity of the vehicle 50. When it has been determined that target features are not present in the vicinity of the vehicle 50, as will be explained below, information collecting image recognition processing is executed. Specifically, when it has been determined that target features are not present in the vicinity of the vehicle 50, it is determined that the position of the vehicle 50 is not recognized with high accuracy (i.e., not in a "high accuracy vehicle position recognition state," the "high accuracy vehicle position recognition state" being described later), and information collection image recognition processing is executed in order to collect learned feature information Fb. Moreover, when the feature information acquiring unit 17 is functioning as the presence determining device, the feature information F may include the learned feature information Fb, or may be limited to the initial feature information Fa. In the present example, both are included.

In the present example, the image recognition unit 18 carries out two types of image recognition processing: (1) position correction image recognition processing that is used in the correcting of the vehicle position information P and (2) information collecting image recognition processing for learning the image recognition results for features and reflecting these results in the feature database DB2. Specifically, for the position correcting image recognition processing, the image processing unit 18 functions as an image recognition device that carries out image recognition processing of target features that are shown by the feature information F, which is included in the image information G, based on the feature information F about the target features that are present in the vicinity of the vehicle 50 and that have been extracted from the feature database DB2 based on the vehicle position information P. In addition, the image recognition unit 18 functions as an image recognition device that carries out image recognition processing for the recognition target objects that are included in the image information G that has been acquired by the image information acquiring unit 12.

In the present example, the image recognition unit 18 carries out position correction image recognition processing when it has been determined that target features, which have been stored as feature information F, are present in the vicinity of the vehicle 50 by the feature information acquisition unit 17. In contrast, the image recognition unit 18 carries out information collection image recognition processing when it has been determined that target features, which have been stored as feature information F, are not present in the vicinity of the vehicle 50 by the feature information acquisition unit 17. When the driver's vehicle 50 is traveling along a road for which feature information F has already been prepared, the correction processing of the vehicle position information P is executed based on the image recognition result obtained by the position correction image recognition processing and the feature information F. In contrast, when the vehicle 50 is traveling along a road for which feature information F has not been prepared, information collection image recognition processing is carried out, and feature collection processing is executed that extracts recognition target objects that are included in the image information G as learned features.

In the position correction image recognition processing, the image recognition unit 18 carries out image recognition processing on the target features that are shown by the feature information F, which is included in the image information G, based on the feature information F for the target features that are present in the vicinity of the vehicle 50 and that have been acquired from the feature database DB2 based on the vehicle position information P. At this time, the image recognition unit 18 sets a predetermined recognition area for which the recognition request for the target features that are shown in the feature information F is carried out, and image recognition processing of the target features is carried out on the image information G that is within this recognition area. The recognition area is set as the position range in the link k shown by the road information Ra, in which it is anticipated that the target features are present.

The photographed area of the actual road included in each set of image information G can be found based on the vehicle position information P by using the positional relationship between the photographed area and the vehicle position that is calculated in advance based on the installation position and installation angle of the imaging device 11 on the vehicle 50, the angle of view, and the like. Thus, based on the information of the photographed areas for each set of image information G that has been found in this manner, the image recognition unit 18 extracts the image information G that corresponds to the recognition area that has been set for each of the target features, and carries out the image recognition processing. When the target features are initial features, the image recognition unit 18 carries out well-known binarization processing or edge detection processing or the like on the image information G, and extracts contour information of the target features (road markings) that are included in the image information G. In addition, target features that are included in the image information G are recognized by carrying out pattern matching on the extracted contour information and the shapes of the target features. When the target features are learned features, as will be explained below, the target features are recognized by providing processing that is similar to the image recognition processing for recognition target objects during learning. In addition, the image recognition results for the target features obtained by this position correction image recognition processing are used in the correction of the vehicle position information P by the vehicle position information correction unit 19.

In the information collection image recognition processing, the image recognition unit 18 carries out the image recognition processing for the recognition target objects that are included in the image information G. This image recognition processing carries out the image recognition processing for recognition target objects without using the feature information F that is stored in the feature database DB2, and therefore, without setting the target features and the recognition area described above. The term "recognition target object" denotes a characteristic that is included in the image information, and includes one or more of any among noise, edges, predetermined colors, and predetermined shapes. In addition, the recognition results for these recognition target objects are characteristic amounts that are obtained by carrying out a predetermined image recognition processing on the recognition target objects. For example, when there are no features on the road surface, the image information for the road surface is uniform. However, when there is some sort of feature present, the uniformity is disrupted. If the cause of the disruption of the uniformity is noise, and if this noise is used as a recognition target object, the amount of the noise is recognized as a characteristic amount. Because such noise is a high-frequency component in the spatial frequency of the image information G, it is possible to extract the noise amount by filtering processing by using, for example, a high pass filter.

Examples of features that can become learned features and that are present on the road surface include road markings provided on the surface of the road, stains on the surface of the road, grime on the surface of the road, cracks in the surface of the road, links between pavement sections, manhole covers, shadows on the surface of the road, and the like. The boundary between stains, grime, and cracks on the road surface and the road surface can be extracted as edge components by providing well-known Gaussian filter processing on the image information G. If this edge component is used as a recognition target object, the amount of the extractions of the edge component is recognized as characteristic amounts. In addition, it is possible to extract the color components of the road markings that are painted in white, yellow, and orange by providing well-known window comparator processing on the image information G. If these colors are used as recognition target objects, the type of color and the number of extractions thereof are recognized as characteristic amounts. In addition, pattern matching processing may be provided in which predetermined shapes such as triangles, circles, rectangles, and numbers and the like are used as recognition target objects, and their conformity may be recognized as characteristic amounts. The recognition results (characteristic amounts) of the recognition target objects that are obtained by the information collection image recognition processing are associated with information for the recognition position thereof, and stored in the learned database DB3.

The vehicle position information correcting unit 19 corrects the vehicle position information P based on the results of the image recognition processing for the target features that are obtained by the image recognition unit 18 and the position information for the target features that is included in the feature information F for the target features. In the present example, the vehicle position information correcting unit 19 corrects the vehicle position information P along the forward travel direction of the vehicle 50 by using the image recognition results for the target features that are obtained by the position correction image recognition processing based on the feature information F in the image recognition unit 18 and the position information for the target features that is included in the feature information F.

Specifically, first, the vehicle position information correcting unit 19 calculates the positional relationships between the vehicle 50 and the target features during the acquisition of the image information G that includes the image of the target features, based on the result of the position correction image recognition processing obtained by the image recognition unit 18 and the installation position and installation angle of the imaging device 11, the angle of view, and the like. Next, based on the calculated result of the positional relationships between the vehicle 50 and the target features, and the position information for the target features that are included in the feature information F for the target features, the vehicle position information correcting unit 19 calculates and acquires high accuracy position information for the vehicle 50 based on the position information (feature information F) of the target features in the forward travel direction of the vehicle 50. In addition, based on the high accuracy position information for the vehicle 50 that has been acquired in this manner, the vehicle position information correcting unit 19 corrects the information about the current position of the vehicle 50 in the forward travel direction, which is included in the vehicle position information P that has been acquired by the vehicle position information acquiring unit 16. As a result, the vehicle position information acquiring unit 16 acquires the high accuracy vehicle position information P after such correction, and the position of the vehicle 50 is recognized with high accuracy (i.e., in the "high accuracy vehicle position recognition state").

The navigation calculating unit 20 is a calculation processing device that operates according to an application program 23 for executing navigation functions such as the vehicle position display, the retrieval of a route from the departure point to the destination point, the course guidance to the destination point, and the destination retrieval and the like. For example, the navigation calculating unit 20 acquires map information M for the vicinity of the vehicle 50 from the map database DB1 based on the vehicle position information P and displays an image of the map in a display input apparatus 21, and at the same time, based on the vehicle position information P, carries out processing in which the vehicle position mark is superimposed and displayed on the image of the map.

The navigation calculating unit 20 carries out the retrieval of routes from a predetermined departure point to a destination point based on the map information M that is contained in the map database DB1. Furthermore, the map calculating unit 20 carries out course guidance for the driver by using one or both of the display input apparatus 21 and an audio output apparatus 22 based on the route from the departure point to the destination point that has been retrieved and the vehicle position information P. In the present example, the navigation calculating unit 20 is connected to the display input apparatus 21 and the audio output apparatus 22. The display input apparatus 21 is one in which a display apparatus, such as a liquid crystal display, and an input apparatus, such as a touch panel, are integrated. The audio output apparatus is structured so as to include a speaker and the like. In the present example, the navigation calculating unit 20, the display input apparatus 21, and the audio output apparatus 22 function as a guidance information output device 24 in the present invention.

Figure 5A:
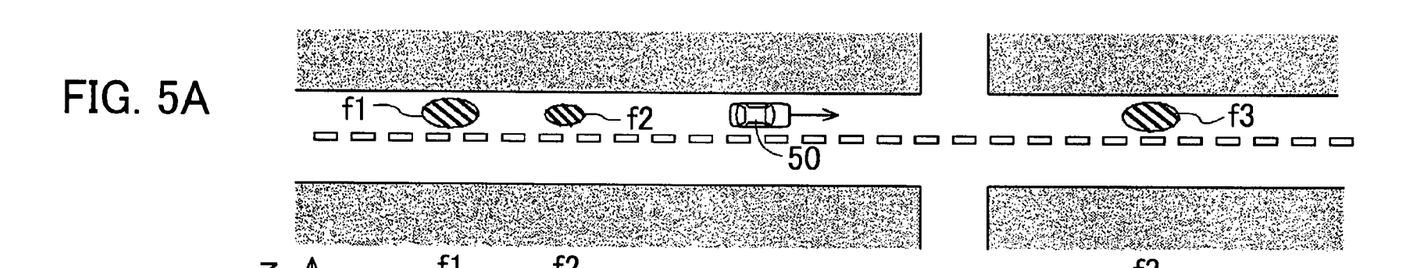
FIG. 5A-FIG. 5C are explanatory drawings for explaining the collection of feature information when a vehicle is traveling along a road for which feature information has not been prepared.
Figure 5B:
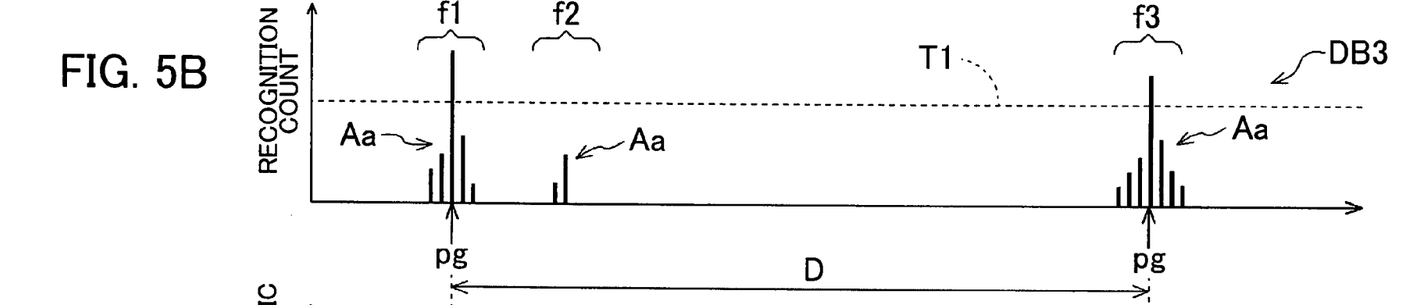
Figure 5C:
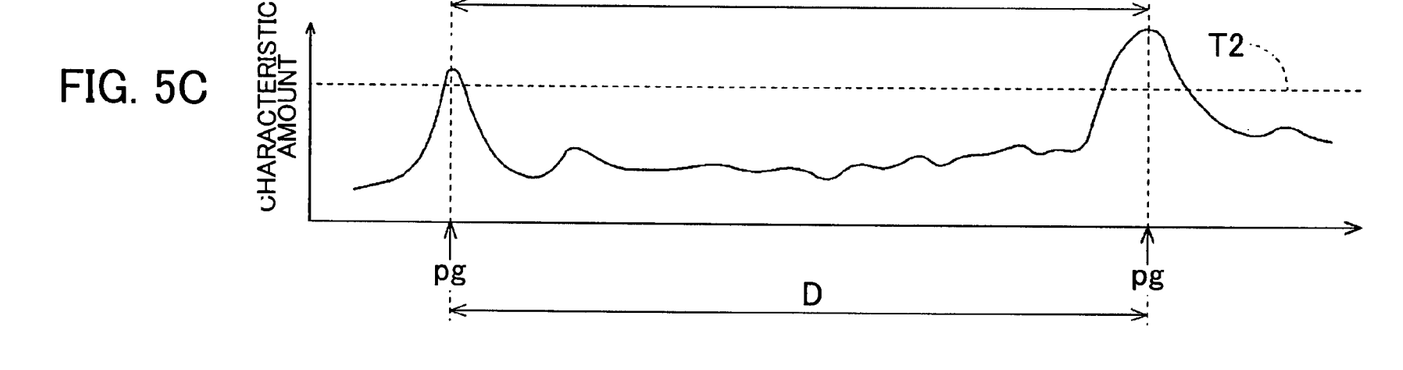

The learned feature extracting unit 31 functions as a learned feature extracting device that extracts recognition target objects that can be repeatedly recognized by image recognition as learned features based on a plurality of sets of recognition information that is related to the same place and that is stored in the learned database DB3 due to the image information G of the same place being recognized by image recognition a plurality of times, and outputs these learned features along with the position information of the learned features. Below, the details of the processing that is carried out by the learned feature extracting unit 31 will be explained with reference to FIG. 5-FIG. 9. As described above, the term "learned features" denotes road markings provided on the surface of the road, stains on the road surface, grime on the road surface, cracks in the road surface, links between pavement sections, manhole covers, and shadows on the road surface. In FIGS. 5A, 5B, and 5C, as an example of the learned features, "stains" are used as the features f1 to f3. The term "recognition information" indicates information that shows the recognition results for the recognition target objects obtained by the image recognition unit 18, and as described above, is a "characteristic amount." The term "recognition target object" denotes noise, edges, predetermined colors, predetermined shapes and the like, that are included in the image information G, and is a characteristic of the image information, and a quantitative recognition result (characteristic amount) of the characteristic of the image information can be obtained by image processing.

The learned feature extracting unit 31 derives the recognition position for the recognition target objects as information that represents the positions of the recognition target objects on the road, using the vehicle position information P as reference. Specifically, the learned feature extracting unit 31 calculates the positional relationship between the vehicle 50 and the recognition target objects during the acquisition of the image information G including the recognition target objects, based on the image recognition result for the recognition target objects obtained by the image recognition unit 18, the installation position and the installation angle of the imaging device 11, the angle of view, and the like. Next, based on the calculation result for the positional relationship between the vehicle 50 and the recognition target objects and the vehicle position information P during the acquisition of the image information G, the learned feature extracting unit 31 calculates the position of the recognition target objects, using the vehicle position information P as reference. In this example, the learned feature extracting unit 31 finds this position as a position in the direction along the link k that represents the road along which the vehicle 50 is traveling. In addition, the learned feature extracting unit 31 derives the position that has been calculated in this manner as the recognition position of the recognition target objects. This recognition position becomes the information about a position that includes the error included in the vehicle position information P because this recognition position is derived based on the vehicle position information P during the acquisition of the image information G including the recognition target objects. Thus, the position information is determined based on the recognition result (recognition information) relating to the same place that is stored in the learning database DB3 due to the image information G of the same place being recognized by image recognition a plurality of times.

FIGS. 5A, 5B, and 5C are explanatory drawings for explaining the collection processing of the feature information F that uses the result of the information collection image recognition processing, using an example of a case in which the vehicle 50 is traveling along a road (link k) for which the feature information F has not been prepared. As shown in FIG. 5A, as one example, the features f1 to f3, which are a stain, grime, a crack or the like, are present on the road on which the vehicle 50 is traveling. The learned feature extracting unit 31 generates recognition position information Aa for the recognition target objects that represents the characteristics of each of the features f1 to f3 of the image information G as a learning value for a predetermined position range (described below) to which the recognition position of the recognition target objects obtained by the image recognition unit 18 belongs. In addition, as shown in FIG. 5B, a learning value is added to each of the position ranges and stored in the learning database DB 3 each time a recognition target object is recognized. The learned feature extracting unit 31 derives an estimated position pg (which will be explained in detail below) for the learned features based on the result of the addition of the learning value. The estimated position pg becomes the position information included in the learned feature information Fb.

As explained above, the learned feature extracting unit 31 derives the recognition positions of the recognition target objects as information that represents the positions of the recognition target objects on the road, using the vehicle position information P as reference. The learned feature extracting unit 31 adds the learning value, which will be described below, to each of the predetermined position ranges to which the recognition position belongs, and stores the result in the learning database DB3. The term "learning value" denotes a value that is allocated depending on the recognition result (characteristic amount) of the recognition target object satisfying predetermined learning conditions. For example, when the recognition target object is "a color that differs from a predetermined color of a road surface due to a stain" and the characteristic amount is the number of color extractions that are the results for the color extraction, a predetermined learning condition is that the number of color extractions is equal to or greater than a predetermined threshold value. Specifically, the learning condition is a condition for which it can be determined whether a recognition target object is fully characterized with respect to quantitatively represented recognition result (characteristic amount).

In the present example, a predetermined position range denotes a range that has been partitioned into units having a predetermined distance in a direction along the link k, which represents a road, and set. For example, the predetermined position range may be a range that has been partitioned into a 0.5 m unit in the direction along the link k. In addition, the term "learning value" denotes a value that is added to a position range to which the recognition position of the features of the recognition target objects in the learning database DB3 belongs. For example, the learning value may be set to one point for each successful image recognition. Specifically, in this example, the recognition position information Aa is structured by the information that represents the position range in which the recognition position of the features of the recognition target objects are included and the information about the learning value (for example, "1"). As has been explained above, the recognition position includes an error that is contained in the vehicle position information P because the recognition position is derived using, as reference, the vehicle position information P during the acquisition of the image information G including the recognition target objects.

Figure 6:
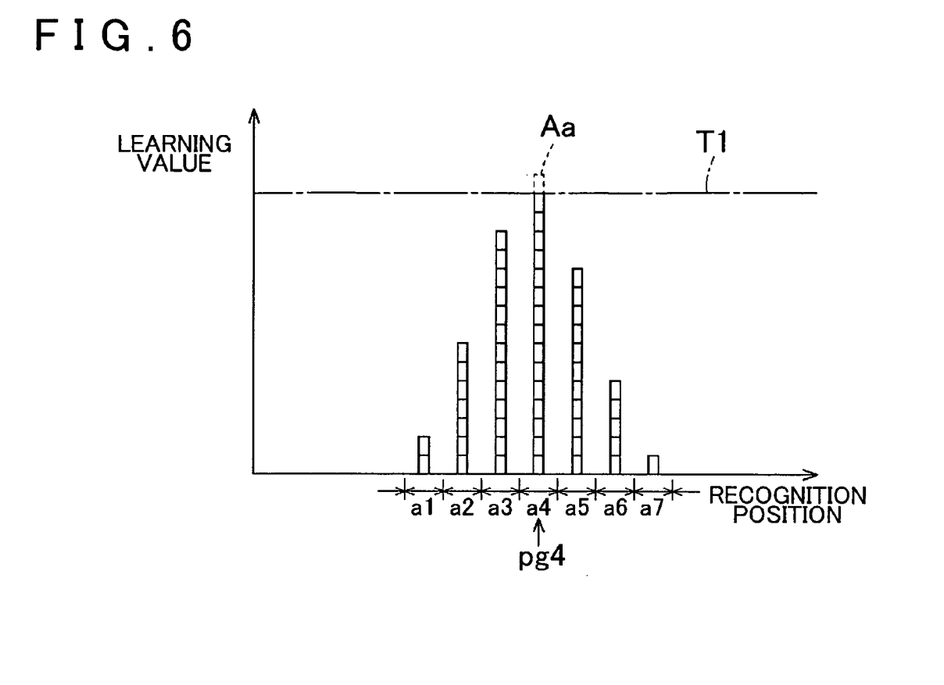
FIG. 6 is an enlarged drawing of the essential part of the learning value that is stored in the learning database shown in FIG. 5B.

FIG. 6 is a partial enlarged drawing related to the feature f1 of the recognition target object of the learning value that is stored in the learning database DB3 shown in FIG. 5B. For example, in the example of FIG. 5A, when the recognition position of the recognition target object (the characteristics of the feature f1) that has been derived by the learned feature extracting unit 31 is the position range that is shown as "a4" in FIG. 6, as shown by the broken line in FIG. 6, "1" is added to the learning value of the position range a4. In addition, when the same recognition target object has been repeatedly recognized by image recognition a plurality of times due to the vehicle 50 passing along the same road a plurality of times, in the learning database DB3, as shown in FIG. 5B and FIG. 6, learning values serve as a plurality of sets of recognition position information Aa that is generated each time the recognition target object is recognized, and the learning values are summed for each of the position ranges that represent the recognition positions of the recognition target objects, and accumulated.

In addition, as will be described below, when the learning value of the position range a4 becomes equal to or greater than a predetermined learned threshold value T1, the learned feature information Fb for the recognition target objects is generated by the feature information generating unit 36 by setting the position that represents the position range a4 as a representative point, and is stored in the learning database DB2. By applying statistical processing in this manner, a large error in the positions that satisfy the learning conditions is also suppressed. In the example in FIGS. 5A, 5B, and 5C, the learned feature information Fb1 and Fb3, which correspond respectively to the feature f1 and the feature f3, are stored in the feature database DB2. Note that, for feature f2 that is shown in FIGS. 5A and 5B, the learned feature information Fb is not generated and not stored in the feature database DB2 because the learning value of the image recognition result for the characteristic of the feature f2, which is the recognition target object, has not reached the predetermined learning threshold value T1.

Figure 7A:
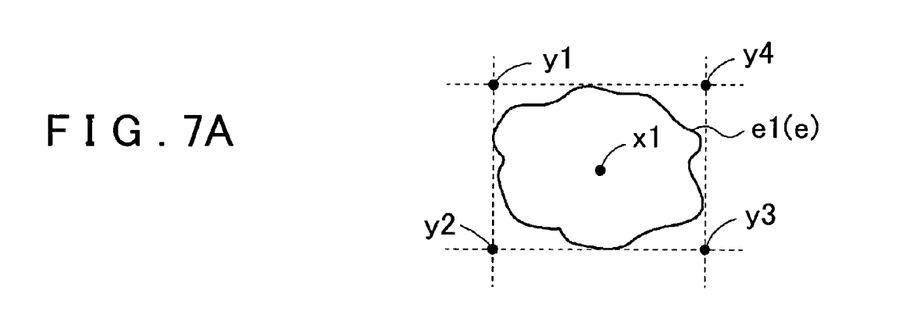
FIG. 7A and FIG. 7B are drawings that show examples of the image processing for a recognition target object and a calculation method of the position information.
Figure 7B:
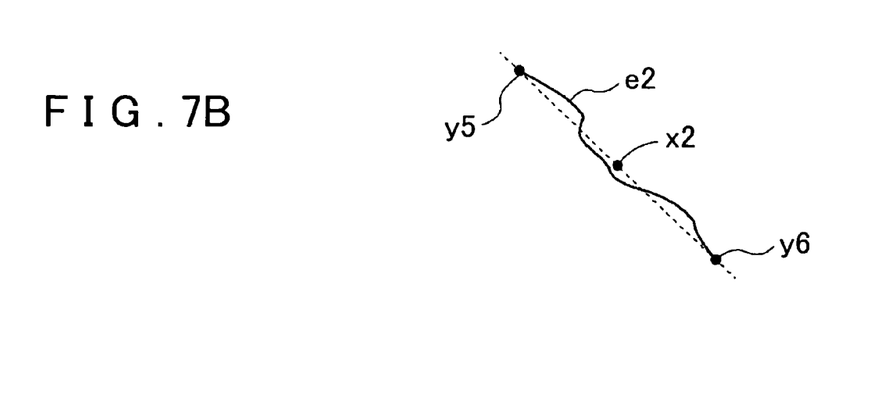

As explained above, according to the present example, not only distinct objects such as road markings, but indistinct objects such as indistinct markings or features on the road surface can be recognized as learned features. Therefore, it is possible to collect learned features at a low cost. Of course, more accurate image recognition may be carried out, shapes such as stains, grime, and cracks may be specified based on the results for color extraction and edge extraction, and learned features whose indistinctness has been reduced may be collected. FIGS. 7A and 7B show an example in which a shape is further recognized based on the results for color extraction and edge extraction, where FIG. 7A shows an example in which a stain or grime on the road surface is recognized and FIG. 7B shows an example in which a crack in the road surface is recognized. As shown in FIG. 7A, when the edge e1 is a closed loop, the attribute of this feature is evaluated as a stain or grime, and the recognition position depending on this attribute is calculated. For example, a rectangular area is set that is parallel to the direction along the link k and circumscribes the feature, the center of gravity x1 is obtained based on the apexes y1 to y4, and it is possible to set this center of gravity x1 as the recognition position. As shown in FIG. 7B, when the edge e2 is not a closed loop or the width is narrow even though the edge e2 is a closed loop, the attribute is evaluated to be a crack, and the recognition position depending on this attribute is calculated. For example, the two end points y5 and y6 of the edge e2 are obtained, and it is possible to set the middle point x2 of the line that connects y5 and y6 as the recognition position.

As explained above, road markings that are provided on the surface of a road are included as learned features that are features present on the road surface, and the type thereof may also be identical to the initial features. In addition, naturally, various types of road markings that are not registered as initial feature information because, for example, their frequency of usage is low, the freedom of shape is large, or the area with respect to the recognition object area is wide, are also included.

Figure 8:
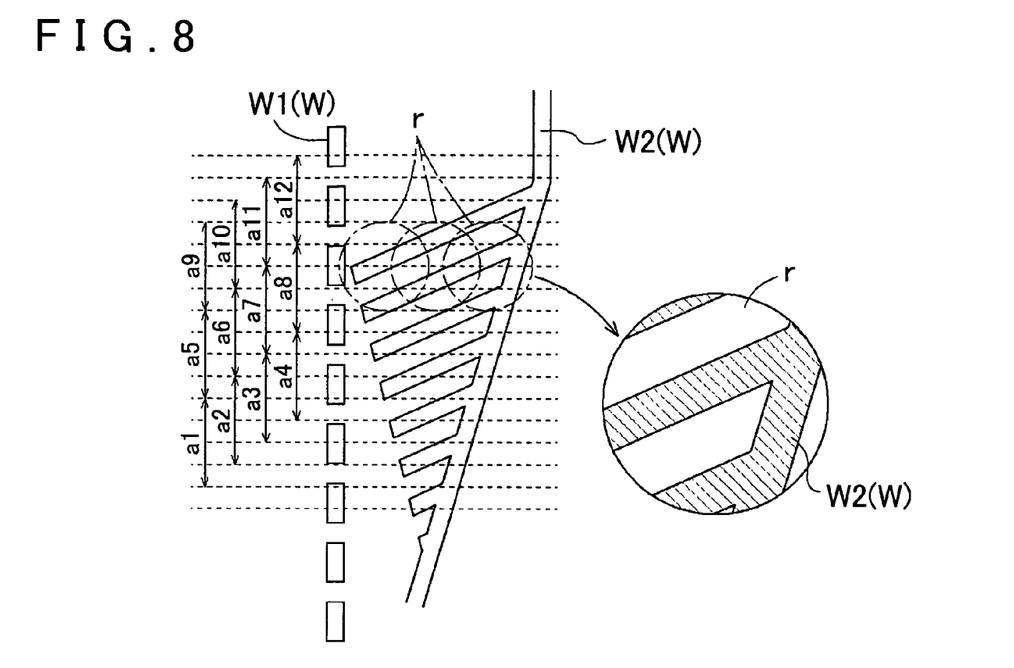
FIG. 8 is an explanatory drawing that shows an example of the image processing for a recognition target object.
Figure 9:
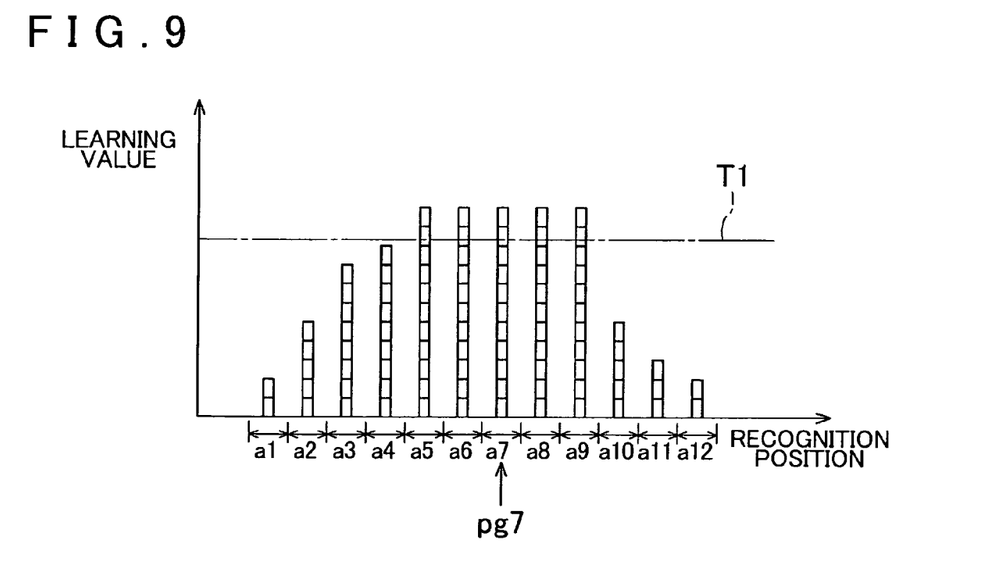
FIG. 9 is an enlarged drawing of the essential part of the learning value of the feature shown in FIG. 8 that is stored in the learning database.

FIG. 8 is an explanatory drawing that shows an example in which the characteristic of a "do not enter" area (that is termed a "zebra zone") is used as the recognition target object. The characteristic that is used as the recognition target object is set to "the area of white in the predetermined region," and the characteristic amount as the recognition result is set to "the proportion of white area in the predetermined region." The image recognition unit 18 executes, for example, window comparator processing such that a white painted portion W and the road surface can be recognized in a predetermined sub-region r. The learned feature extracting unit 31 sets the learning value to "1" when a painted portion W included in the sub-region r is equal to or greater than a predetermined portion. As explained above, for each of the successful image recognitions, the learning value is added to the position range to which the recognition position of the recognition target object in the learning database DB3 belongs. The recognition position can be set, for example, to the center of a circular sub-region r, and the learning value is added to the position range to which the center of the sub-region r belongs. FIG. 9 is a drawing that shows an example of the summing of the learning values for each of the predetermined position ranges for the zebra zone as shown in FIG. 8. Because the zebra zone has a large area, as shown in FIG. 9, the learning value is added to a plurality of sub-regions r, and the learned threshold value T1 is exceeded by the same number of points in a plurality of position ranges. In this case, for example, the middle position range a7 may be used as the position information (estimated position pg) of the learned features.

Note that a feature that is provided with a characteristic that is used as a recognition target object is not limited to stains, grime, cracks, or the like that are normally present on the road surface, but can also include ones that appear when predetermined conditions occur together, such as a particular time and weather. For example, shadows are also included in features. In this case, the recognition information is stored in the learning database DB3 in association with at least one set of information about the recognition time and the weather during the recognition. In addition, the learned feature extracting unit 31 extracts a recognition target object (the characteristic of the shadow) that is associated with at least one of the recognition time or the weather during the recognition and can be repeatedly recognized by image recognition under predetermined conditions as limited learned features that are valid only when these conditions are satisfied.

Specifically, it is possible to use this recognition target object as a limited learned feature by including these limiting conditions in the feature attribute information Ab, which will be described below. A feature such as a shadow has a strong characteristic as a recognition target object because the contrast with the road surface is high, but the point that the appearance thereof is influenced by the time and weather is a cause of instability. However, features can be used as advantageous learned features by using such features as limited learned features that take into consideration predetermined conditions such as the time and the weather during which such features appear.

In this connection, the learned feature extracting unit 31 stores the generated recognition position information Aa in association with the feature attribute information Ab that represents each of the attributes of the recognition target object in order to make the recognition target object that has been successfully recognized by image recognition distinguishable from other recognition target objects. The attributes of the recognition target object that are included in the feature attribute information Ab may be ones that distinguish one recognition target object from another recognition target object. Therefore, for example, feature attribute information Ab is provided with one or more sets of information that is selected from among types of characteristics that serve as a recognition target object, that is, classifications such as color, edges, and noise and the like, or in the case that shape recognition has been carried out, the specific shape and size thereof, and the link ID of the link k on which the recognition target object is present and the like. In addition, the limiting conditions for the limited learned features such as the time and weather may also be included in the feature attribute information Ab. The information that structures the feature attribute information Ab for such features is generated based on, for example, the image recognition result for the recognition target object obtained by the image recognition unit 18 and the vehicle position information P during the acquisition of the image information G according to the image recognition processing.

The estimated position determining unit 34 functions as an estimated position determining device that determines the estimated position pg (refer to FIG. 5) of the recognition target object based on a plurality of sets of recognition position information Aa for the same place, which is stored in the learning database DB3, by the image information for the same place being recognized a plurality of times by image recognition to correspond to the recognition target object. Based on the distribution of a plurality of sets of the recognition position information Aa related to the same place, the estimated position determining unit 34 determines that the representative values of the distribution are to be used as the estimated position pg of the recognition target object. In the present example, the mode values are used as the representative values of the distribution. Specifically, the estimated position determining unit 34 uses as a representative point the position that represents the position range in which the learning value used as the recognition position information Aa for each of the recognition target objects first becomes equal to or greater than a predetermined learning threshold value T1, and determines that this position is the estimated position pg of the recognition target object. That is, the estimated position determining unit 34 extracts the recognition target object in the position range in which the learning value becomes equal to or greater than the predetermined learning threshold value T1 as the learned feature, and uses the position that represents this position range as the estimated position pg. The determination method for the case in which the estimated position pg of the recognition target object (the characteristic of the feature f1) in the example of FIG. 5 is determined will be explained as one example. As shown in FIG. 6, the learning value used as the recognition position information Aa for the feature f1 first becomes equal to or greater than the learning threshold value T1 in the position range a4. Therefore, the estimated position determining unit determines that a position that represents the position range a4, for example, the center position pg4 of the position range a4, is the estimated position pg for the feature f1.

A feature information managing unit 35 carries out the management of the feature information F that has been stored in the feature database DB2 based on the learned results for the target features that have been stored in the learning database DB3. In the present example, this feature information managing unit 35 is provided with a feature information generating unit 36 and a feature-to-feature distance determining unit 37. These will be explained separately below.

The feature information generating unit 36 generates learned feature information Fb based on the learned results for features that have been stored in the learning database DB3. Specifically, the feature information generating unit 36 generates learned feature information Fb, in which the position information that represents the estimated positions pg for each of the recognition target objects that has been determined by the estimated position determining unit 34, and the feature attribute information based on the image recognition result for the recognition target object that has been obtained by the image recognition unit 18, are associated. In the learning database DB3, the feature attribute information that structures the learned feature information Fb is generated by using the content of the feature attribution information Ab that has been stored in association with the recognition position information Aa for the recognition target object. Thus, the learned feature information Fb, similar to the initial feature information Fa, is generated as position information and information that is provided with feature attribution information that has been associated therewith. In addition, the learned feature information Fb that has been generated by the feature information generating unit 36 is stored in the feature database DB2. In the present example, learned feature information Fb5, which includes the attributes of features such as classifications such as stains, grime, cracks, road markings (paint) and limiting conditions for limited learned features, is generated by the feature information generating unit 36 and stored in the feature database DB2.

The feature-to-feature distance determining unit 37 f determines the feature distance D, which represents the distance between two learned features, based on a plurality of sets of recognition position information Aa for the two learned features. In the present example, the feature-to-feature distance determining unit 37 finds the feature distance D between the two learned features by calculating the distance between the estimated position pg for one learned feature and the estimated position pg for the other feature by using the information for the estimated positions pg for the two features that have been determined by the estimated position determining unit 34. In the example shown in FIG. 5A and FIG. 5C, the feature-to-feature distance determining unit 37 obtains the distance between two learned features that are adjacent to each other. Specifically, in this example, the feature-to-feature distance determining unit 37 determines this distance by obtaining the feature distance D between the feature f1 and the feature f3. The information for the feature distance D that has been determined by this feature-to-feature distance determining unit 37 is used as information that structures the learned feature information Fb, which has been generated by the feature information generating unit 36. Specifically, in the present example, the learned feature information Fb for each of the learned features is generated as information that includes associated information that represents the relationship between one learned feature and another learned feature that is adjacent thereto and the feature distance information that represents the feature distance D between the one learned feature and the other learned feature.

Next, an exemplary feature information collecting method will be explained with reference to FIG. 10 (and FIGS. 5A and 5B as a specific example). The exemplary method may be implemented, for example, by one or more components of the above-described apparatus 1. However, even though the exemplary structure of the above-described apparatus 1 may be referenced in the description, it should be appreciated that the structure is exemplary and the exemplary method need not be limited by any of the above-described exemplary structure.

Figure 10:
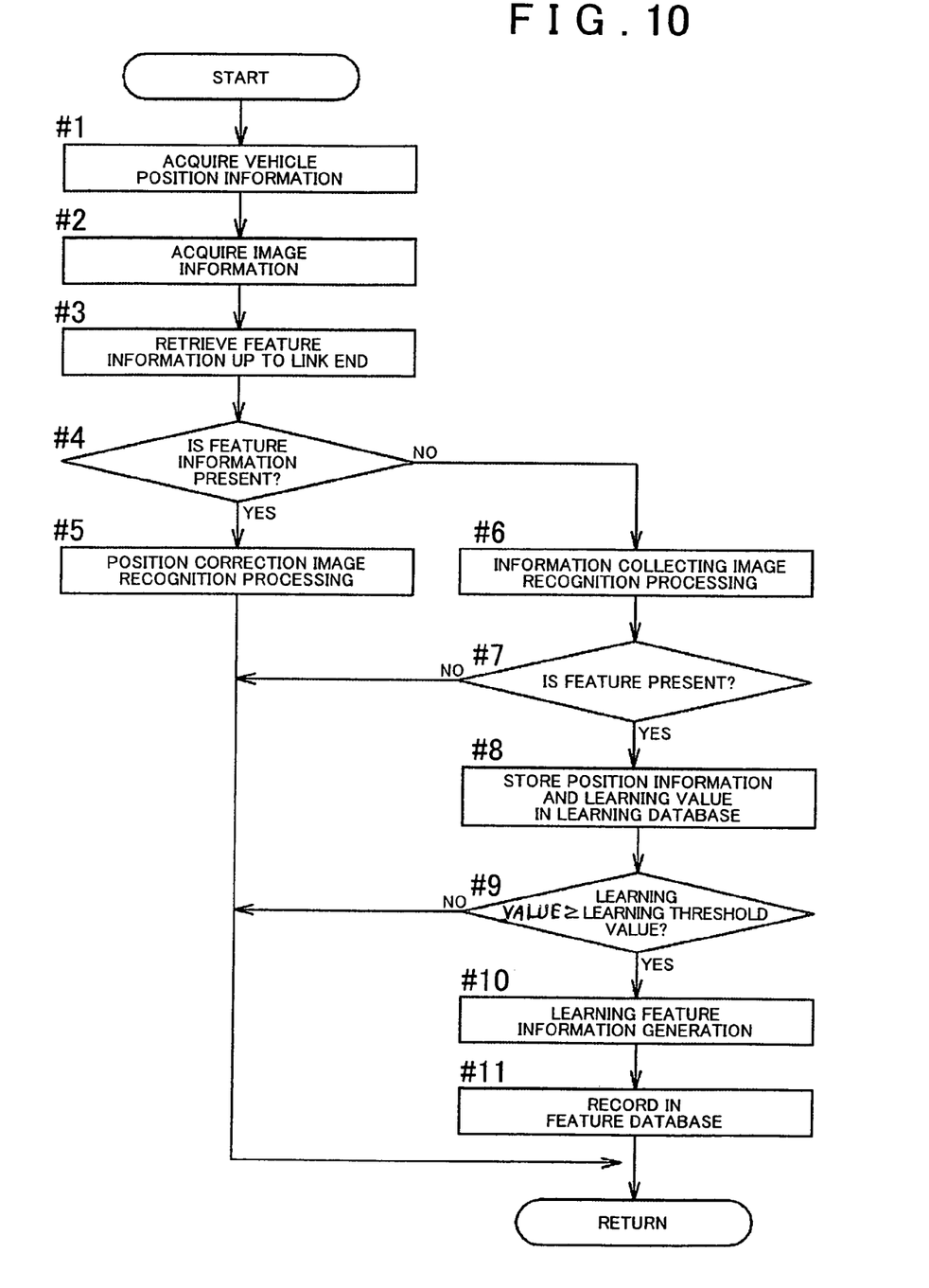
FIG. 10 is a flowchart that shows an example of a feature information collecting method.

As shown in FIG. 10, in the navigation apparatus 1, first, the vehicle position information P is acquired by the vehicle position information acquiring unit 16 (step #1). Next, image information G for the vicinity of the vehicle 50, which has been photographed by the imaging device 11, is acquired by the image information acquiring unit 12 (step #2). Subsequently, feature information F for target features that are present from the current position of the vehicle 50 (the vehicle position), which is shown in the vehicle position information P, to the end of the link k that represents the road on which the vehicle 50 is traveling is acquired from the feature database DB2 by the feature information acquiring unit 17 (step #3), and the presence or absence of the feature information F is determined (step #4). The feature information F may be either the initial feature information Fa or the learned feature information Fb.

When it has been determined that there is feature information F (step #4=YES), the vehicle 50 is traveling along a road for which the feature database DB2 has been prepared. Therefore, the position correction image recognition processing described above is carried out by the image recognition unit 18 (step #5). Specifically, the image recognition unit 18 carries out image recognition processing by setting recognition areas for each of the target features that are shown by each of the sets of the feature information F that have been acquired. When the target features inside the recognition area have been recognized by image recognition, the correction of the vehicle position P is carried out by the vehicle position information correcting unit 19 based on the image recognition result for the target features and the position information for the target features, which is included in the feature information F for the recognition target object. Thus, the position of the vehicle 50 is recognized with a high accuracy (i.e., in the "high accuracy vehicle position recognition state").

In contrast, when it has been determined that there is no feature information F (step #4=NO), the navigation apparatus 1 executes feature information collecting image recognition processing (step #6). First, the image processing for the recognition target objects that are included in the image information G is executed by the image recognition unit 18. When a recognition target object has been recognized by image recognition (step #7=YES), it is determined that there is a feature that will become a candidate for a learned feature, and when no recognition target object has been recognized by image recognition (step #&=NO), the processing ends.

When a recognition target object has been recognized by image recognition (step #7=YES), the recognition position of the feature is derived by the learned feature extracting unit 31 based on the vehicle position information P that has been acquired in step #1. In addition, the position information for the recognition target object and the learning value are stored in the learning database DB3 (step #8). Specifically, the recognition position information Aa that represents the derived recognition position of the feature is generated as a learning value for a predetermined position range to which the recognition position belongs, and as shown in FIGS. 5B and 6, the learning value is added for each of the position ranges and the result is stored in the learning database DB3.

Next, it is determined whether the learning value that is stored in the learning database DB3 that is equal to or greater than the predetermined learned threshold value T1 (step #9). When the learning value is less than the predetermined learned threshold value T1 (step #9=NO), the processing ends. In contrast, when the learning value, which has been stored in the learning database DB3 and that serves as the recognition position information Aa for the target features, is equal to or greater than the predetermined learned threshold value T1 (step #9=YES), the estimated position pg of the feature is determined by the estimated position determining unit 34. Subsequently, the learned feature information Fb that is associated with the estimated position pg of the recognition target object and the feature attribute information based on the image recognition result is generated by the feature information generating unit 36 (step #10). The generated learned feature information Fb is stored in the feature database DB2 step (#11).

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the example described above, as shown in FIG. 5B, the position information for a learned feature is estimated by using a method in which the learning value for a predetermined position range is added. However, the learned feature extracting unit 31 may estimate the position information of the learned features by using the method described below. The learning database DB3 stores as-is the quantitative recognition result (characteristic amount) that has been obtained by image recognition processing being carried out on a recognition target object as a raw value, as shown in FIG. 5C. Specifically, the learning database DB3 continuously stores the raw value of the characteristic amount that serves as the recognition result for a recognition target object in association with position information. In addition, the learned feature extracting unit 31 extracts as a learned feature the recognition target object at a position at which a peak is present, based on the distribution of the recognition result for the stored recognition target object, and uses the information for the position at which the peak is present as the position information (estimated position pg) for the leaned feature.

FIGS. 5A, 5B, and 5C show an example in which stains, which will become learned features, are recognized as features f1 to f3, and the characteristics of the image of the recognition target object are, for example, the boundaries between a color that differs from a predetermined color of the road surface and the road surface color. When window comparator processing is provided as image recognition processing that uses the color of the road surface as an extraction target object, it is possible to extract a color that differs from the color of the road surface. FIG. 5C shows the relationship between the characteristic amount and the recognition position by setting the number of extractions of colors that differ from the color of the road surface extracted in this manner is used as a characteristic amount (recognition result). The characteristic amounts of the features f1 and f3 are large because they are large stains, and the characteristic amount of the feature f2 is small because it is a small stain. The learned feature extracting unit 31 extracts the recognition target object (a stain whose characteristic is a color) as a learned feature when, for example, there is a characteristic amount that is equal to or greater than a predetermined characteristic amount threshold T2 and a peak thereof is present in the distribution of the characteristic amounts. In addition, information for a position at which this peak is present is used as the position information (estimated position pg) for the learned feature. As explained above, the recognition position of the result of the recognition is information for a position that includes an error possessed by the vehicle position information P because the recognition position of the recognition result is derived based on the vehicle position information P during the acquisition of the image information G, which includes the recognition target object. Because the raw values of the characteristic amounts for each time when traveling a plurality of times are summed and then stored in the learning database DB3, the error can be absorbed for a position where a peak in the characteristic feature is present, and it is possible to estimate the position information for a learned feature with high accuracy.

Note that this method can be used to determine whether learning should be carried out. For example, when water drops adhere to the lens of the imaging device 11 during inclement weather, the image information G deteriorates. As a result, the distribution of the recognition result will not change sufficiently, and thus the recognition results at this time may be excluded from the stored target objects for learning.

Road markings that are not registered as initial feature information due to having a low use frequency but have a simple shape can be used as features that have a characteristic as a recognition target object. It is possible to set the shape of such a road marking to a predetermined shape and set this predetermined shape as a recognition target object. For example, a triangular mark that shows "there is a through street ahead" and characters that are drawn on the road surface as instruction indicators and the like correspond to such road markings.

A characteristic as a recognition target object may be set to "the proportion of white on the road surface," and based on the result of carrying out the extraction processing for a predetermined color, a possibility that a feature having a characteristic as a recognition target object is a road marking may be determined. Then, when the possibility that the feature is a road marking is high, a shape recognition algorithm for road markings (pedestrian crossings, stop lines, and the like) that have a high frequency of appearance may be executed, and higher accuracy features may be collected.

In the example described above, the recognition position of a recognition target object that is represented by the recognition position information Aa is derived as information that represents the position of the feature on the road based on the vehicle position information P. However, for example, setting the recognition position that is represented by the recognition position information Aa to the position of the vehicle 50, which is represented by the vehicle position information P during the acquisition of the image information G including the recognition target object, is also possible. In this case, when the learned feature information Fb is generated by the feature information generating unit 36, it is advantageous to calculate the position of the feature on the road that is the recognition target object in the image information G for the position of the vehicle 50, and to set the position of the feature on the road having a characteristic that serves as a recognition target object as the position information that is included in the learned feature information Fb.

In the example described above, a learning value of one point is added for each time that image recognition is successful. However, the number of points that differs according to the recognition results may be added. For example, as explained using FIG. 8, when the "the area of white in the predetermined region" is set as the recognition target object and the characteristic amount that serves as the characteristic that becomes the recognition result is set to the "the proportion of white area in the predetermined region," the number of points that differ according to this "proportion" may be added. For example, the number of points may differ according to the recognition results such that, for example, one point is added when the proportion is equal to or greater than 50% and 3 points is added when the proportion is equal to or greater than 70%.

Figure 11:
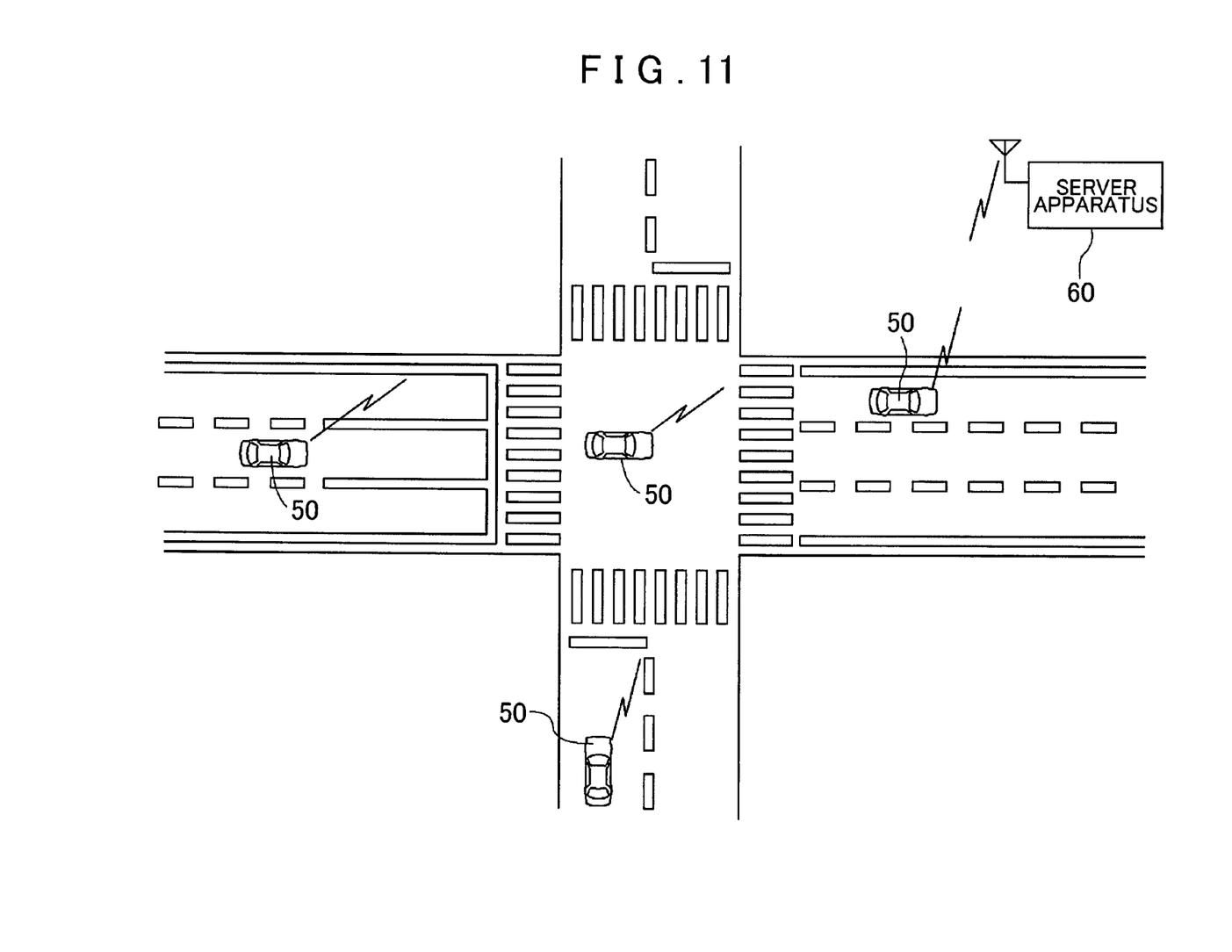
FIG. 11 is a drawing that shows an example of a feature information collecting apparatus including a server.

In the example described above, the entire structure of the feature information collecting apparatus 2 is mounted in the vehicle 50. However, as shown in FIG. 11, a structure in which a portion of the structure of the feature information collecting apparatus 2 that includes the learning database DB3 as the recognition result storing device of the present invention is disposed in a server apparatus 60 that is connected so as to be able to communicate with a plurality of vehicles 50 via a wireless communication circuit is also possible. If the feature information collecting apparatus 2 is structured in this manner, it is possible to accumulate the learned results for features obtained by a plurality of vehicles 50 in the learning database DB3 that is disposed in the server apparatus 60. Therefore, it is possible to generate feature information F that has higher accuracy position information by using more recognition position information Aa. Note that the structure of the feature information collecting apparatus 2 that is disposed in the server apparatus 60 is not limited to the learning database DB3, and the entire structure excluding the structures that need to be mounted on the vehicle 50, for example, the imaging device 11, the vehicle position information acquiring unit 16 and the like, may be disposed in the server apparatus 60. In addition, similarly, disposing in the server apparatus 60 a portion of the structures of the image recognition apparatus 3, the vehicle position recognition apparatus 4, and the navigation apparatus 1 is also possible.

(7) In each of the examples described above, the image recognition apparatus 3 and the vehicle position recognition apparatus 4 are used in the navigation apparatus 1. However, the range of application of the present invention is not limited to this, and it is naturally possible for these apparatuses to be used for other applications, such as a vehicle travel control apparatus.

What is claimed is:

1. A feature information collecting apparatus, comprising:
a first memory; and
a controller that:
    acquires vehicle position information that represents a current position of a vehicle;
    acquires image information for a vicinity of the vehicle;
    carries out image recognition processing on recognition target objects that are included in the image information;
    stores recognition information in the first memory that represents a result of the image recognition of the recognition target objects in association with information for the recognition position of the recognition target objects, the recognition position determined based on the vehicle position information; and
    extracts, as learned features, recognition target objects that can be repeatedly recognized by image recognition based on a plurality of sets of recognition information related to the same position, the plurality of sets of recognition information being stored due to the image information for the same position being recognized a plurality of times by image recognition;
wherein the recognition information is a characteristic amount represented by at least one of a noise amount and an amount of extractions of edge included in the image information.

2. The feature information collecting apparatus according to claim 1, wherein:
the controller stores the recognition results for the recognition target objects in association with information about the recognition position in the first memory;
the recognition information includes a distribution of the recognition results for each target object; and
the controller extracts recognition target objects at a positions where a peak in the distribution is present as the learned features, each peak representing the position information for each extracted learned feature.

3. The feature information collecting apparatus according to claim 1, wherein the controller:
adds a learning value to each of a predetermined position range each time the recognition results for the recognition target objects satisfy learning conditions, the learning value allocated due to the recognition results for recognition target objects satisfying predetermined learning conditions;
extracts as the learned features the recognition target objects in a position range in which the learning value has become equal to or greater than a predetermined learning threshold value; and
uses a position associated with each position range as the position information for the learned features.

4. The feature information collecting apparatus according to claim 1, wherein:
the recognition information is stored in association with predetermined conditions including information about at least one of recognition time and weather during the recognition; and
the controller extracts recognition target objects that can be repeatedly recognized by image recognition during the predetermined conditions as limited learned features that are valid only when the conditions are satisfied.

5. The feature information collecting apparatus according to claim 1, wherein the controller:
determines a feature-to-feature distance that represents a distance between two learned features based on the position information for the two learned features.

6. The feature information collecting apparatus according to claim 1, wherein:
the apparatus is connected so as to be able to communicate with a plurality of vehicles; and
the first memory stores the recognition information that has been obtained by the plurality of vehicles.

7. The feature information collecting apparatus according to claim 1, wherein:
the learned features include at least one of road markings provided on a surface of a road, stains on the surface of a road, grime on the surface of a road, cracks in the surface of a road, and shadows on the surface of a road.

8. The feature information collecting apparatus according to claim 1, wherein:
the first memory stores feature information for the target features including:
learned feature information that is associated with attribute information related to the recognition information for the learned features and position information for the learned features; or
both the learned feature information and initial information that includes position information and attribute information that has been prepared in advance for a plurality of features.

9. The feature information collecting apparatus according to claim 8, wherein the controller:
refers to the feature information based on the vehicle position information and determines whether the target features that have been stored as feature information for the vicinity of the vehicle are present; and
carries out the storing of the recognition information when the target features are not present in the vicinity of the vehicle.

10. A vehicle position recognizing apparatus comprising:
the feature information collecting apparatus according to claim 8; and
a controller that:
corrects the vehicle position information based on the image recognition result for the target features;
carries out image recognition processing for the target features represented by the feature information that is included in the image information, based on the feature information for the target features that are present in the vicinity of the vehicle that is extracted based on the vehicle position information; and
corrects the vehicle position information, based on the image recognition results for the target features and the position information that is included in the feature information for the target features.

11. A navigation apparatus comprising:
the vehicle position recognizing apparatus according to claim 10;
a second memory that stores map information; and
a controller that provides outputs guidance information based on the map information.

12. A feature information collecting method, comprising:
acquiring vehicle position information that represents a current position of a vehicle;
acquiring image information for a vicinity of the vehicle;
carrying out image recognition processing on recognition target objects that are included in the image information;
storing recognition information that represents a result of the image recognition of the recognition target objects in association with information for the recognition position of the recognition target objects, the recognition position determined based on the vehicle position information; and
extracting, as learned features, recognition target objects that can be repeatedly recognized by image recognition based on a plurality of sets of recognition information related to the same position, the plurality of sets of recognition information being stored due to the image information for the same position being recognized a plurality of times by image recognition;
wherein the recognition information is a characteristic amount represented by at least one of a noise amount and an amount of extractions of edge included in the image information.

13. The feature information collecting method according to claim 12, further comprising:
storing the recognition results for the recognition target objects in association with information about the recognition position, the recognition information including a distribution of the recognition results for each target object; and
extracting recognition target objects at a positions where a peak in the distribution is present as the learned features, each peak representing the position information for each extracted learned feature.

14. The feature information collecting method according to claim 12, further comprising:
adding a learning value to each of a predetermined position range each time the recognition results for the recognition target objects satisfy learning conditions, the learning value allocated due to the recognition results for recognition target objects satisfying predetermined learning conditions;
extracting as the learned features the recognition target objects in a position range in which the learning value has become equal to or greater than a predetermined learning threshold value; and
using a position associated with each position range as the position information for the learned features.

15. The feature information collecting method according to claim 12, wherein:
the recognition information is stored in association with predetermined conditions including information about at least one of recognition time and weather during the recognition; and
the method further comprises extracting recognition target objects that can be repeatedly recognized by image recognition during the predetermined conditions as limited learned features that are valid only when the conditions are satisfied.

16. The feature information collecting method according to claim 12, further comprising:
determining a feature-to-feature distance that represents a distance between two learned features based on the position information for the two learned features.

17. The feature information collecting method according to claim 12, further comprising:
communicating with a plurality of vehicles; and
storing the recognition information that has been obtained by the plurality of vehicles.

18. The feature information collecting method according to claim 12, wherein:
the learned features include at least one of road markings provided on a surface of a road, stains on the surface of a road, grime on the surface of a road, cracks in the surface of a road, and shadows on the surface of a road.

* * * * *